United States Patent [19]

Comroe et al.

[11] Patent Number: 4,667,191
[45] Date of Patent: May 19, 1987

[54] SERIAL LINK COMMUNICATIONS PROTOCOL

[75] Inventors: Richard A. Comroe, East Dundee, Ill.; Jaime A. Borras, Hialeah, Fla.; Wayne H. Browand; Ozzie F. Ramos, both of Sunrise, Fla.; Ted A. Kozlowski, Chicago, Ill.; Timothy A. Mitchell, Plantation, Fla.; Randy L. Ekl, Hoffman Estates, Ill.

[73] Assignee: Motorola, Inc., Schaumburg, Ill.

[21] Appl. No.: 684,641

[22] Filed: Dec. 21, 1984

[51] Int. Cl.[4] .............................................. H04N 3/02
[52] U.S. Cl. .................................. 340/825.5; 370/85; 340/825.52
[58] Field of Search ........... 340/825.52, 825.5, 825.07, 340/825.51; 370/85, 91–94

[56] References Cited

U.S. PATENT DOCUMENTS

| 4,063,220 | 12/1977 | Metcalfe et al. | 340/147 LP |
| 4,093,823 | 6/1978 | Chu | 370/92 |
| 4,383,257 | 5/1983 | Giallanza et al. | 340/825.44 |
| 4,451,886 | 5/1984 | Guest et al. | 340/825.07 |
| 4,482,999 | 11/1984 | Janson et al. | 370/86 |
| 4,534,025 | 8/1985 | Floyd | 370/85 |
| 4,539,677 | 9/1985 | Lo | 370/94 |
| 4,593,282 | 6/1986 | Acampora et al. | 340/825.5 |

Primary Examiner—Donald J. Yusko
Attorney, Agent, or Firm—Donald B. Southard; Thomas G. Berry

[57] ABSTRACT

An optimized method of bus contention comprising monitoring the bus for an idle or busy bus condition and either attempting an asynchronous bus access if the bus is idle or synchronously attempting a prioritized retry after a busy bus condition is sensed, after a bus access collision is sensed, and upon initial power-up, synchronized to the current message completion. The prioritization comprises a constant time delay plus a bit-time delay proportional to said accessing device's address identification.

3 Claims, 5 Drawing Figures

SERIAL LINK COMMUNICATIONS PROTOCOL

CROSS REFERENCES TO RELATED APPLICATIONS

The instant patent application is related to the following patent applications filed on even date herewith and are hereby incorporated by reference thereto and made a part hereof as if fully set forth herein;
Internally Register-Modelled, Serially-Bussed Radio System Method of Communications Between Register-Modelled Radio Devices Human-Engineered Radio Control Unit

THE FIELD OF INVENTION

The invention disclosed herein is, henerally, concerned with serial communication protocols.

More particularly, this invention relates to serial link communication protocols for serially bussed two-way radios.

BACKGROUND OF THE INVENTION

The need for this invention arose from problems in serially communicating information between radio subsystems in an internally-bussed two-way radio. Specifically, the problems to be addressed were those of transmission economy, bus contention, error detection and subsystem device addressing.

Register modeling and serial linkage of radio subsystems is at the heart of the architecture for the latest generation of two-way radios. The radios are constructed by interconnecting independent radio subsystems, control heads and accessories with the basic R.F. modem over a bidirectional serial link, as illustrated in FIG. 1.

The serial link interfaces with the radio devices via standard Universal Asynchronous Receiver/Transmitter (UART) devices. Thus, message protocols must be based upon sequences of eight-bit words, each with start and stop bits, as is customary with these devices.

Others have attempted to solve the problem by asynchronous ASCII character packet transmission, randomized bus access retry, checksum or cyclical redundancy check error detection, and source and destination addressing.

A general purpose protocol has the ability to communicate data and control information between devices. Typically, a general purpose protocol defines a primitive set of operations that a device can perform. An operation code is usually transmitted near the beginning of a message to instruct the recipient as to how to treat the remaining transmission.

The currently accepted methodology is to reserve a unique eight-bit word within the permissible character set as a recognizable start-of-message. Its meaning is reserved and will, therefore, not appear anywhere else in the message. The start-of-message contains no other information and owes its sole existence to designating the legitimate start of the message. For example, a message that is start and aborted due to collision or device failure, can confidently be ignored when the next start-of-message word is seen. This is infinitely preferable to the reception and misinterpretation of an aborted message. Accordingly, the start-of-message word must maintain its uniqueness by not serving any other function—it must be a reserved word.

A multi-device, multi-access protocol must also reserve a number of words to identify various devices on the serial bus. To provide for acknowledgment of received messages and handshaking between devices, often, protocols transmit both the address of the originating device and the address of the device to which the message is destined.

For error detection, many protocols append a checksum or other error detection contrivance.

In multiple access busses, collision avoidance and bus contention must be anticipated and orchestrated. Many systems provide for randomized retry for bus access, hoping that randomization will reduce the possibility of further collisions.

However, each of these considerations take their toll in protocol design sacrificing transmission efficiency with starts-of-messages, source addresses, destination addresses, and checksums and requiring bus contention randomization overhead.

The instant invention solves these problems by economizing and ôptimizing transmissions, eliminating randomization overhead, simplifying bus contention and simplifying device addressing.

This invention represents a significant advance over the prior art and over this technical field by providing an economized, optimized serial communications protocol with simplified addressing and bus contention.

BRIEF SUMMARY OF THE INVENTION

It is the object of the present invention to provide an economized, optimized serial communications protocol with simplified addressing and bus contention.

It is a further object of the invention to provide economized and optimized transmissions.

Another object of the present invention is to simplify subsystem device addressing.

Yet another object of the present invention is to eliminate randomization overhead upon bus access retry.

A final object of the invention is to simplify bus contention.

The ultimate object is to provide an economized, optimized serial communications protocol with simplified addressing and bus contention.

In accordance with the present invention, there is provided an optimized, transmission-economized serial bus protocol comprising at least one eight-bit word further comprising at least an operation code and a subargument. The operation code and subargument comprise, respectively, either a start-of-message character or a start-of-reply character and either a device destination address or the device's source address. Further, an error detection device is provided comprising an even parity bit.

Moreover, there is provided an optimized method of bus contention comprising monitoring the bus for an idle or busy bus condition and either attempting an asynchronous bus access if the bus is idle or synchronously attempting a prioritized retry after a busy bus condition is sensed, after a bus access collision is sensed, and upon initial power-up, synchronized to the current message completion. The prioritization comprises a constant time delay plus a bit-time delay proportional to the accessing device's address identification.

Finally, there is provided an optimized method of inter-device message addressing and handshaking in a multi-access, bussed system, each device having a source and destination address, comprising addressing a message to a destination address and awaiting the addressed destination device to acknowledge by echoing its corresponding source address and also monitoring the bus for an announcement of a source addressed event and performing a function in response thereto.

Thus, there has been provided an economized, optimized serial communications protocol with simplified addressing and bus contention.

BRIEF DESCRIPTION OF THE DRAWINGS

Additional objects, features, and advantages, in accordance with the present invention, will be more clearly understood, by way of unrestricted example, from the following detailed description, taken together with the accompanying drawings, in which.

The invention will be readily appreciated by reference to the detailed description when considered in conjunction with the accompanying drawings in which like reference numerals designate like parts throughout the Figures.

THE DESCRIPTION OF THE PREFERRED EMBODIMENT

The preferred embodiment of the disclosed serial link protocol comprises an inventive method of:
- economizing and optimizing transmissions without making the protocol special purpose by including a start-of-message and start-of-response character in the character set and making it unique by combining it with a unique device address,
- supporting both individual, device-destined messages that require acknowledgments and announcement messages that do not require acknowledgments, thereby increasing transmission econoby by eliminating the necessity of transmitting both source and destination addresses with each message, and
- accessing the serial bus without collision retry randomization overhead by synchronously prioritizing the retrys in accordance with its device identification address.

CHARACTER FORMATS

Figure 1:
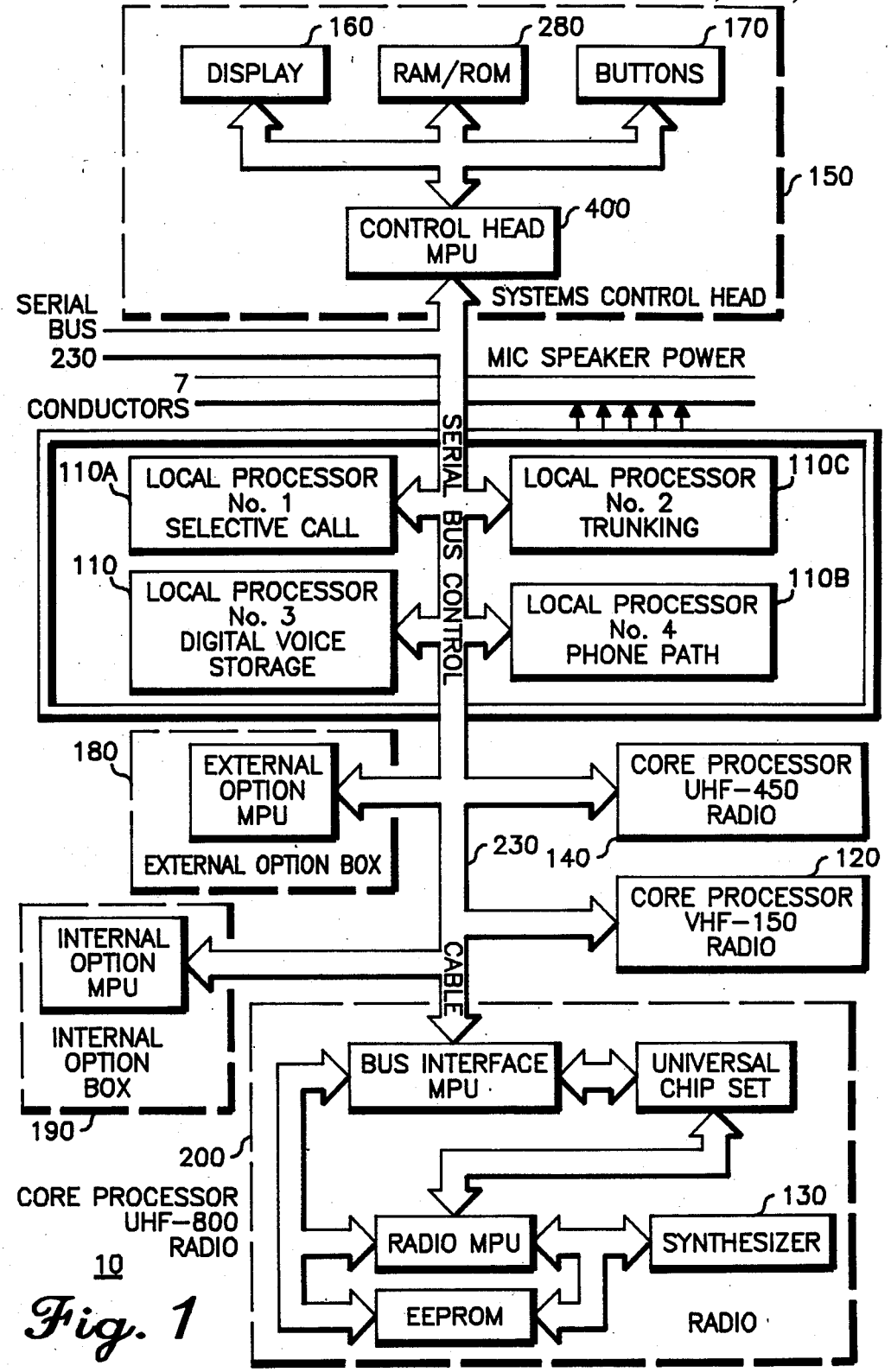
FIG. 1 is a block diagram illustrating a serially-bussed, register-modelled, subsystem addressable radio system in which the preferred embodiment of the present invention is utilized.
Figure 2:
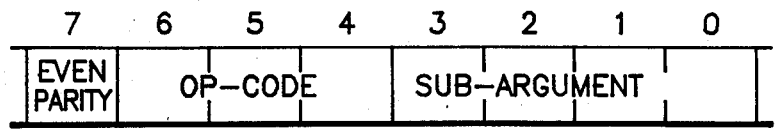
FIG. 2 is a bit diagram illustrating the signalling format used in the preferred embodiment of the present invention.

FIG. 2 is a bit diagram illustrating the signalling format used in the preferred embodiment of the present invention. Each and every character is composed of the illustrated subcharacter fields. Bits 4–6 contain a three-bit operation code. Bits 0–4 contain a four-bit subargument of the operation code. Bit 7 is an even parity, error detecting bit.

OP-CODE CHARACTERISTICS

There are eight unique op-codes corresponding to bits 4–6 illustrated in FIG. 2. They are:

| Op-code | Definition |
| --- | --- |
| 0 | Start-of-Message |
| 1 | Start-of-Reply |
| 2 | Function |
| 3 | Primary Data |
| 4 | Bit Clear |
| 5 | Write |
| 6 | Bit Set |
| 7 | Read |

START OF TRANSMISSION

By defining the start-of-message and start-of-reply as an operation code, rather than merely one of the characters in a data set (e.g., ASCII), and combining each with the unique four-bit device address in the subargument field, thirty two non-reoccurring chracters are generated. Accordingly, eight devices can be defined on the system, each having a destination address and a different source address. Thus, each device has a dual identification.

Depending upon the type of message to be sent, the eight-bit word will contain either a destination-specific or its own source address in the subargument field. A destination address subargument specifies which device is to receive the message whereas a source address subargument specifies the orginating device.

Figure 3:
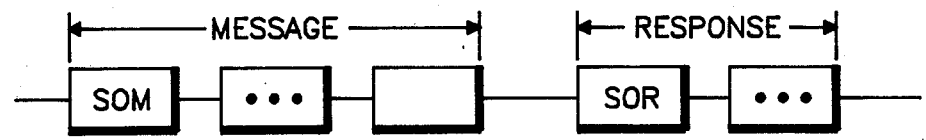
FIG. 3 is a time line illustrating the message protocol used in the preferred embodiment of the present invention.

As illustrated in FIG. 3, when a destination-specific message is transmitted, the designated recipient acknowledges with its own source address as the subargument to a start-of-response op-code.

Figure 4:
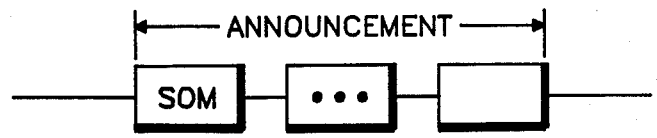
FIG. 4 is a time line illustrating the announcement protocol used in the preferred embodiment of the present invention.

As illustrated in FIG. 4, when a device wants to announce a local event to whomever is interested, it will broadcast an announcement with its own source address as the subargument to a start-of-message opcode. No acknowledgment is required.

With this inventive protocol, economy of transmission is achieved without making the protocol special-purpose. The start-of-transmission indicators have been combined with device addresses to generate thirty two non-reoccurring, unique eight-bit words that are uniquely recognizable. Each message is identifiable as to its destination. Each acknowledged message receipt is identifiable by its echoed source address. Each broadcasted announcement is identifiable by the source address of its origin. Transmission efficiency is achieved by compacting all of that information into a single, eight-bit word with parity as opposed to transmitting a three-word preamble containing a start-of-message indication, a source address and a destination address and a postamble checksum with each transmission.

Further transmission economies are realized though an inventive bus access protocol. The protocol is, basically, a Carrier Sense, Multiple Access (CSMA) technique with collision detection. This implies that when the bus is sensed to be idle, any device wishing to initiate a transmission may asynchronously do so at any moment. Collision detection is provided by requiring the transmitting device to read back each word transmitted to ensure data integrity.

Figure 5:
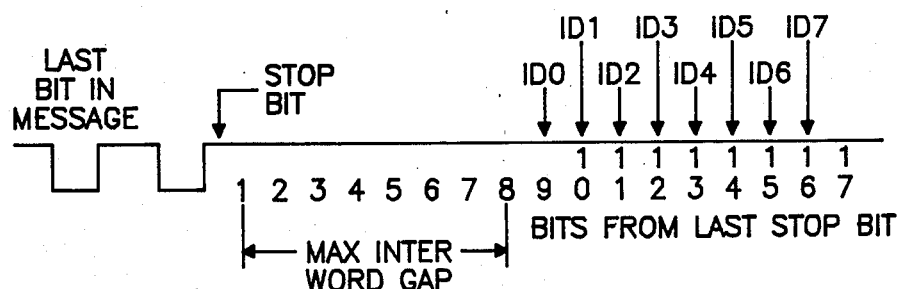
FIG. 5 is a timing diagram illustrating the bus access prioritization of the preferred embodiment of the present invention.

This protocol differs from others in the way it accesses the bus when busy. Referring to FIG. 5, each device must wait a specific period of time following each word seen on the bus before deciding that the link is free. The time delay is minimally long enough to ensure that the gap following the last observed word is not an inter-word gap within a message dialog (i.e., an addressed device must respond within this gap). In addition to the required inter-word gap, each device must wait a prioritized period of time. In the preferred embodiment, the priority is based upon the device's address or I.D. Thus, each device will attempt to access the bus at a different time after the completion of the previous message. Since the waiting period is prioritized, lower I.D.'s are able to access the bus at least one bit before the next highest prioritized device. Therefore, collision should never occur except when the bus has been idle for a long time. In that event, the device with the lowest I.D. will retry for bus access first, without collision.

Thus, there has been provided an economized, optimized serial communications protocol with simplified addressing and bus contention.

Further, there has been provided a serial link communications protocol that has economized and optimized transmissions, simplified subsystem device addressing, no randomization overhead upon bus access retry, and simplified bus contention.

It will be appreciated by those skilled in the art of serial communication protocols that the foregoing description of the various embodiments are merely illustrative of the broad inventive concept comprehended by the invention and has been given for clarity of understanding by way of unrestricted example. However, it is not intened to cover all changes and modifications which do not constitute departures from the spirit and scope of the invention.

What we claim and desire to secure by Letters Patent is:

1. In a multi-access, serial bus communication system having a plurality of transceiving devices each having an address identification, a method of bus contention comprising the steps of:
    (a) monitoring the bus for an idle or busy bus condition;
    (b) attempting, by any transceiving device, an asynchronous bus access if the bus is idle, and monitoring the bus for an access collision;
    (c) synchronously attempting a prioritized retry after a busy bus condition is sensed, or after a bus collision is sensed.

2. The bus contention method as claimed in claim 1 wherein said prioritization comprises:
    a bit-time delay proportional to said accessing device's address identification, whereby the plurality of transceiving devices sequentially attempt bus reaccess one at a time.

3. The bus contention method as claimed in claim 2 wherein said prioritization further comprises:
    a constant time delay.

* * * * *

UNITED STATES PATENT AND TRADEMARK OFFICE
CERTIFICATE OF CORRECTION

PATENT NO. : 4,667,191

DATED : MAY 19, 1987

INVENTOR(S) : COMROE ET AL.

It is certified that error appears in the above-identified patent and that said Letters Patent is hereby corrected as shown below:

The Title "Serial Link Communications Protocol" should read --Serial Link Contention Method--.

Column 1, line 16, "henerally" should be --generally--.

Column 1, line 60, "start" should be --started--.

Column 3, line 49, "econoby" should be --economy--.

Signed and Sealed this

Twenty-second Day of September, 1987

Attest:

DONALD J. QUIGG

*Attesting Officer*     *Commissioner of Patents and Trademarks*